United States Patent [19]

Greenfield et al.

[11] E Re. 31,185

[45] Reissued Mar. 22, 1983

[54] PROCESS AND APPARATUS FOR DEHYDRATING WASTE SOLIDS CONCENTRATES

[75] Inventors: Charles Greenfield, Murray Hill; Anthony J. Bonanno, Parsippany, both of N.J.

[73] Assignee: Hanover Research Corporation, East Hanover, N.J.

[21] Appl. No.: 356,346

[22] Filed: Mar. 9, 1982

Related U.S. Patent Documents

Reissue of:

[64] Patent No.: 4,276,115
Issued: Jun. 30, 1981
Appl. No.: 96,391
Filed: Nov. 21, 1979

[51] Int. Cl.[3] ..... B01D 1/26

[52] U.S. Cl. ..... 159/1 RW; 159/17 R; 159/47.3; 210/771; 210/774; 210/806; 210/195.3

[58] Field of Search ..... 210/609, 767–771, 210/806, 774, 195.3, 178, 180, 197, 202, 218; 159/1 RW, 17 R, DIG. 25, 47 WL; 202/174; 203/25

[56] References Cited

U.S. PATENT DOCUMENTS

| | | | |
|---|---|---|---|
| Re. 26,317 | 12/1967 | Greenfield | 159/17 C |
| 1,955,064 | 4/1934 | Hawley | 210/66 |
| 3,323,575 | 6/1967 | Greenfield | 159/17 R |
| 4,007,094 | 2/1977 | Greenfield | 159/1 RW |
| 4,097,378 | 6/1978 | St. Clair | 210/67 |
| 4,125,465 | 11/1978 | Turovsky et al. | 210/10 |
| 4,196,077 | 4/1980 | Berkowitz et al. | 210/73 S |

*Primary Examiner*—Benoit Castel
*Attorney, Agent, or Firm*—Richard L. Cannaday; William J. Ungvarsky; Robert C. Schmertz, Jr.

[57] ABSTRACT

An apparatus and process for dehydrating waste solids concentrates including secondary and digested sewage sludges and those concentrates prone to form emulsions upon the addition of oil are obtained and accomplished by mixing the sludge or other concentrate with fluidizing oil prior to dehydration by heat evaporation to maintain pumpability; recycling a portion of the substantially anhydrous waste solids and oil evaporator output slurry, and admixing it with the fluidizing oil and input sludge or concentrate to regulate the solids content and viscosity of the steady state feed mixture and thereby prevent fouling of the evaporator heat transfer surfaces and convert emulsions to suspensions.

15 Claims, 1 Drawing Figure

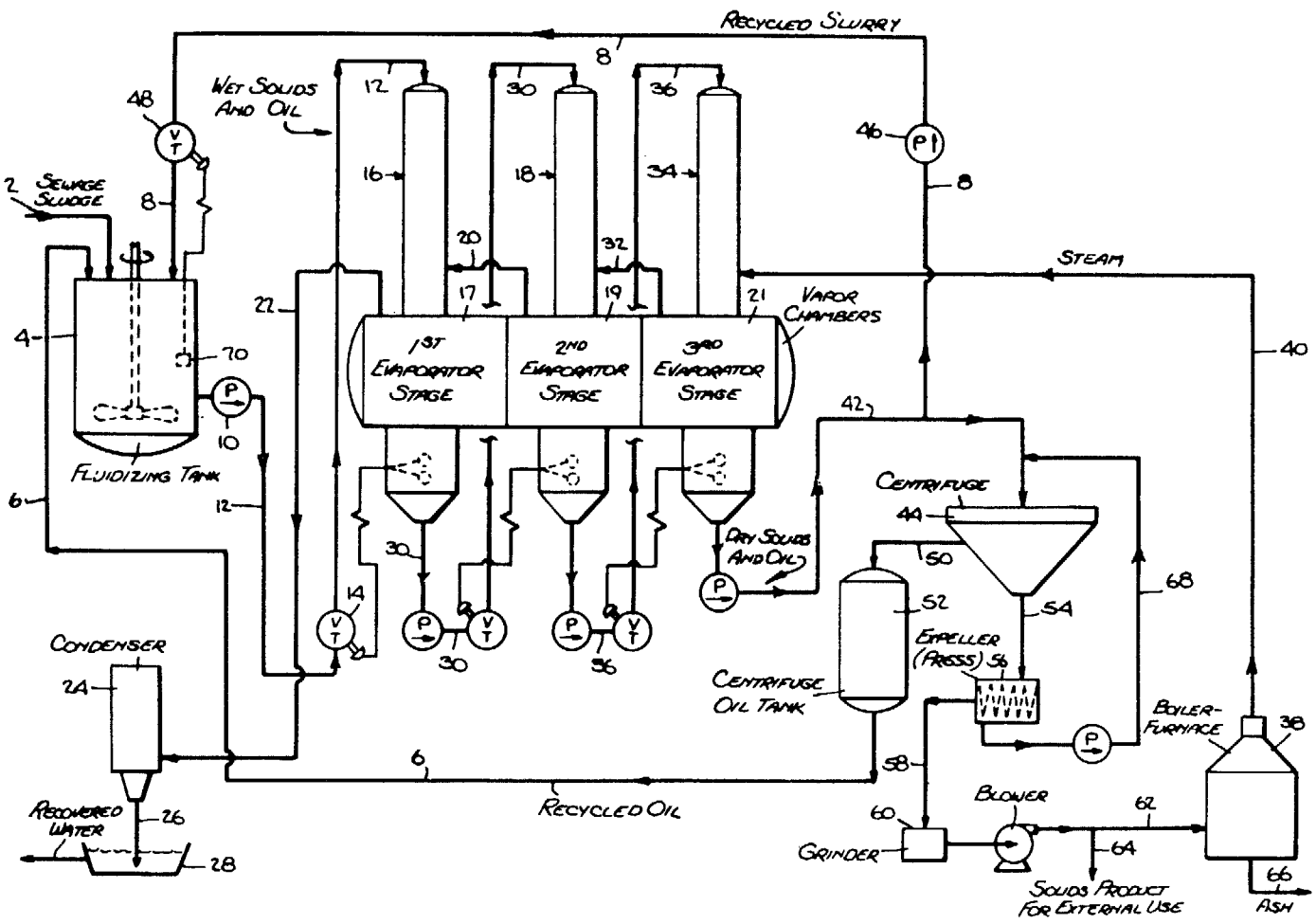
Recycled Slurry
Steam
Vapor Chambers
3RD Evaporator Stage
2ND Evaporator Stage
1ST Evaporator Stage
Dry Solids And Oil
Centrifuge
Expeller (Press)
Centrifuge Oil Tank
Boiler-Furnace
Blower
Grinder
Solids Product For External Use
Ash
Recycled Oil
Wet Solids And Oil
Sewage Sludge
Fluidizing Tank
Condenser
Recovered Water

PROCESS AND APPARATUS FOR DEHYDRATING WASTE SOLIDS CONCENTRATES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an apparatus and process for dehydrating waste solids concentrates, especially sewage sludge. More particularly, it relates to an apparatus and process wherein such concentrates, kept pumpable by having been mixed with fluidizing oil, are subjected to repeated dehydrations at successively higher concentrations.

2. Discussion of the Prior Art

The economic disposal of sewage sludge is a recognized problem. Processes and apparatus for dehydrating sewage sludges and other waste solids concentrates have been developed to deal with problems of disposal, avoidance of pollution, hygienic handling, economic operation, and the like. In those processes by-products are produced which are either valuable in themselves or can be utilized to further the process in some way.

In treating sewage it is customary to settle the raw sewage, generating a primary sewage sludge and a separated water fraction. That fraction is aerated to provide a secondary sewage sludge, usually but not necessarily an activated sludge, and clean water of quality suitable for discharge into a stream or river. Both primary and secondary sludges are discharged into a digester which is a closed tank in which the sludge may have a dwell time of up to 30 days or longer. There, heating coils may maintain the sludge at a somewhat elevated temperature to accelerate anaerobic bacterial digestion of organic constituents and the breakdown of solids, in part, into gaseous materials. The gaseous materials have a sufficient methane content to be useful as fuel for heating water circulated in the digester coils. The digested material is withdrawn as a stream of sewage solids or digested sludge which may have a water content of about 95%, and is spread out in large drying beds for drying by evaporation. The resulting dry solids may be burned, either supplying heat to the process or in uses as fuel outside the process, or they may be employed otherwise, for example, as fertilizer.

This invention is concerned with an improvement in an already improved apparatus and process to be used instead of the digester, or at least instead of the drying beds customarily associated therewith. The basic, known equipment needed to carry out the process operations is far more compact and appreciably less expensive than digester equipment and drying beds, particularly where the drying beds must be enclosed to control odors and permit year-round use.

The apparatus and process of which the present invention provides an improvement related to drying an initially water-containing waste solids concentrate, particularly sewage sludge, by admixing it with a fluidizing oil to obtain a mixture which remains fluid and pumpable even when the water content thereof has been removed. The resulting oil-containing mixture is passed through a sequence of dehydration steps in which the mixture is dehydrated by heat evaporation, becoming increasingly dehydrated. In a generally preferred or at least fairly widely practiced embodiment of the known art, economies of energy consumption are realized by utilizing the evolved vapors from each evaporation step in a "backward flow" arrangement to supply a substantial portion of the heat requirements of the preceding evaporation step, with the dehydration occurring at progressively higher temperatures as described in U.S. Pat. No. Re. 26,317. The process of that patent generates a substantially anhydrous slurry of sewage solids in oil which is withdrawn and further treated in a centrifuge to provide a substantially oil-free as well as dry sewage solids product and recover at least most of the fluidizing oil for re-use in the process. Further employments of the oil-fluidizing of initially water-containing waste solids concentrates for dehydration in single-stage evaporators and multiple-stage, "forward flow" evaporators are disclosed respectively in U.S. Pat. No. Re. 26,352 and U.S. Pat. No. 3,323,575.

By way of definition, with regard to evaporators in which fluid mixtures may be dehydrated in a plurality of sequential steps as well as those in which all dehydration takes place in a single stage, the expression "first stage" refers to that part of the evaporator equipment in which the hydrated mixture or wet slurry is subjected to the first step of the aforesaid sequential plurality of dehydration steps, two or three or more corresponding to "first stage", "second stage", "third stage", etc. The expression "effect", on the other hand, as in "multiple-effect", "first effect", "second effect", etc., is related to the flow and action of the heating material, steam here, in the evaporator equipment. Where the flow of the wet slurry being progressively heated and dried is countercurrent to that of the heating steam from stage to stage or effect to effect, the operation particularly illustrated and described in U.S. Pat. No. Re. 26,317 aforesaid and in the present case representing the condition of "backward flow", the first stage of a multi-effect of multiple-effect evaporator is the same as its last effect. Conversely, where the flow of wet slurry is cocurrent with that of the heating steam from stage to stage or effect to effect, the operation particularly illustrated and described in U.S. Pat. No. 3,323,575 aforesaid representing the condition of "forward flow", the first stage and first effect are the same as indeed they are in a single-stage or single-effect evaporator according to the disclosures of U.S. Pat. No. Re. 26,352 aforesaid. It is not especially meaningful to describe a single-stage or single-effect evaporator as operating in either backward flow or forward flow.

Sewage sludge, hereinafter sometimes simply called sludge, treated by the cited processes generally comprises non-fat solids in an amount of 2 to 50 or more weight percent, usually 3 to 35 weight percent; fluid fats or oils on a dry basis in an amount of about 1.0 to 30 weight percent, usually 8 to 20 weight percent, with the remainder of the mixture being predominantly water. The solids particle size is normally less than about one-quarter inch, encompassing the normal distribution in sewage sludge. Larger particles, such as occur in garbage, should be comminuted prior to being treated according to the dehydration process of the invention.

Oils useful in those processes for admixture with sewage sludge to provide the necessary fluidization are inert, relatively non-volatile oils or fats, or other non-volatile oil-like materials or the non-volatile fractions thereof. Typical of those oils are tallow, animal fats and vegetable oils, all of which can be derived directly from the process, depending upon the particular material or materials treated and also petroleum oils, fuel oils, glycerides, glycols and mixtures thereof, including industrial by-products. The quantity of oil used is such that its ratio in the system is approximately 2 to 20 times the weight of the non-fat solids. That refers to total oil, i.e., that added plus that derived from the process for reuse. Such an amount of oil is sufficient, under normal conditions, to give or maintain the condition of a fluid, pumpable mixture even when the water content is or has been removed from the mixture.

It has been noted recently that, in the course of concentrating certain sludges in a multi-effect evaporator system of the type described in U.S. Pat. No. Re. 26,317 and here, using a fluidizing oil carrier, there can be an increase in the viscosity of the oil slurry in some stage which reduces the heat transfer rate and results in a reduction in concentration capacity. It has been found that in sludges which, prior to fluidizing, have solid contents in the range of 10% to 35% on an oil-free basis, and which contain appreciable amounts of secondary sludge or digested sludge, there is an increase in viscosity during the concentration process which is sometimes accompanied by fouling of the heat transfer surfaces. In addition such sludges are difficult to fluidize, even with the addition of large quantities of fluidizing oil, often resulting in a difficult sludge pumping problem between the fluidizing tank and the evaporator system or array. That appears to be due to insufficient wetting of the sludge particles by the fluidizing oil which results in agglomeration of the particles, the formation of solid clumps in a separate phase from the added oil, and consequent reduction in fluidity of the sludge-oil mixture.

While dispersing agents can be added to the slurry system, oil-soluble agents are usually required and their use results in added operating costs because of the difficulty of recovering them. Attempts to improve the mixing operation by intensifying the mixing cause formation of an oil-sludge emulsion which results in further thickening. The oil-sludge emulsion can sometimes coat the heat transfer surfaces of the evaporator, fouling and reducing the heat transfer coefficient of those surfaces. Such a condition can lead to plugging of evaporator tubes. Those problems have been found to be particularly difficult when a petroleum oil, rather than an animal or vegetable oil or fatty acid, is used as the fluidizing oil medium or carrier.

It would be desirable, therefore, to avoid a physical change in an oil-sludge or sludge or sewage solids mixture being dehydrated in an evaporator as described above, which change manifests itself as and results in the presence of a coalesced clump or mass or emulsion adversely affecting the viscosity of the system and reducing the heat transfer efficiency or capability of the evaporator.

SUMMARY OF THE INVENTION

It has been found that by adding back or recycling oil-containing solids from the output of a late stage, usually the last stage, of the evaporator to the input of the concentrating system, the problems noted above are reduced materially. Thus, there are avoided an increase in viscosity due to clumping, thickening, or the formation of an emulsion and the accompanying fouling of the heat transfer surfaces of the dehydrating evaporator. In situations in which the oil-sludge mixture contains secondary and/or digested sludge varying in concentration from 10% to about 35% solids on an oil-free basis, it has been found desirable to raise the solids content of the mixture fed to the evaporator between 25% and 60% with a preferred range of 30% to 50% on an oil-free basis. The fluidity of the oil-sludge mixture is greatly improved and so is the heat transfer rate. In fact, it has been found that the oil-to-solids ratio, on a water-free or dry basis, can be significantly reduced, for example, from about 10 to 1 to about 5 or 6 to 1, and that increased evaporation rates and improved non-fouling properties in the oil-sludge or oil-solids mixture are achieved. Where the received sludge has a solids concentration less than 10%, preliminary concentration can be accomplished by centrifuging, belt pressing, vacuum filtering, or other technique well known in the art.

It appears that the add-back of the oil-solids slurry greatly improves the dispersion of solid particles without forming an emulsion. Also, the solids suspend readily in the oil medium rather than forming two immiscible phases in which, under similar prior mixing conditions, oil separation and solid clumps occurred when using the untreated mixture. The fluidized mixture is readily pumped into the evaporator system and the water present, though initially greater in mass than the solids, does not form a separate phase, but, rather, remains solids-bound.

It has been found also that where a solids material tends to form an emulsion with the oil phase, that emulsion can be converted to a suspension by using the same technique, i.e., by the addition of solids to raise the solids concentration at the evaporator input to 25% to 60% on an oil-free basis. Thus the present invention has benefits for the oil-sludge system since it modifies the clumping of solids or breaks or aborts emulsions, bringing about a uniform suspension of the solids in the fluidizing oil. In that condition the solids are said to be compatible with the oil.

The nature of the oil used is important as well. It has been found that petroleum oils are more difficult media in which to form desirable suspensions than are animal and vegetable oils and fatty acid derivatives. Consequently the petroleum oils are benefited by using this technique, particularly the light oils which have boiling points in the range 300° F. to 500° F.

The process of adding back a substantially anhydrous solids-in-oil slurry according to the present invention has particular utility for treatment of activated secondary sludges in which there are dead aerobic organisms which tend to produce clumping in the solids. The technique is also applicable to digested sludge containing dead anaerobic organisms which have been produced from a primary and activated sludge mixture. Digested primary sludge also is suitable for processing according to the invention, but undigested or raw primary sludge is not. However, a mixture of raw primary sludge and activated sludge does require or at least is suitable for the concerned treatment because of the activated, broadly secondary, sludge content of the mixture. In the latter case, however, the solids addition need not be as great.

According to the invention, the preferred method is to recycle substantially anhydrous solids back to the fluidizing tank as a solids-in-oil slurry produced in the dehydration process, such as a solids-in-oil slurry obtained from the final dehydrating stage. The substance added back may be taken from an intermediate concentrating evaporator stage, as well, but the preferred way is to add back from the drying or final stage. While water-free and oil-free solids from a number of sources, including dry solids produced as an end product of the process, could be added back, it has been found that from the point of view of required handling apparatus, simplicity of control and conservation of energy the feeding or adding back of a slurry is most effective.

BRIEF DESCRIPTION OF THE DRAWING

The sole FIGURE is a schematic representation of an apparatus useful in practicing the teachings of the invention in the backward flow mode of operation of a multi-stage or multi-effect evaporator.

DETAILED DESCRIPTION OF THE DRAWING

As shown in the drawing, sewage sludge enters the apparatus through input line 2 at the left, and is fed to fluidizing tank 4 for mixing with fluidizing oil supplied through line 6 and substantially anhydrous slurry of sewage solids and oil recycled through line 8. Pump 10 moves the resulting mixture of oil and sewage sludge high in solids content from tank 4, through connecting line or conduit 12 and throttle valve 14, to the tube bundle or evaporating region of first stage 16 of a three-stage or triple effect evaporator. Each stage of the evaporator removes about one third of the water from the oil-sludge mixture supplied at 16. The input sludge received through line 2 may typically be in the range of from 10 to 35 or somewhat higher weight percent solids and fats, with the balance being water. Of the solids and fats perhaps 1% to 5% is fat referred to the entire input sludge, and the balance is nonfat solids. At start-up, sufficient fluidizing oil is added through line 6 to insure that, after evaporation of the water content, the system or mixture of sewage solids and oil and/or fluid fats remains pumpable.

In first evaporator stage 16 about ⅓ of the water is boiled off at a reduced pressure of approximately 2 inches Hg absolute, and the temperature of the partially dehydrated product in that evaporator stage sump or bottom is maintained at approximately 110° F. Heating vapor enters first evaporator stage 16 from second stage vapor chamber 19 through connecting line 20 at a temperature in the neighborhood of 145° F. Vapor is removed from first evaporator stage vapor chamber 17 via connecting line 22 which passes it into a condenser 24. There, cooling water condenses the vapor and the recovered water is discharged through line 26 to hot well 28. A slurry of partially dehydrated sewage solids in fluidizing oil is removed continuously from evaporator 16 through line 30 and fed to the evaporating region of second evaporator stage 18.

In second evaporator stage 18 a procedure is followed similar to that in the first stage, except that the sump or product temperature is maintained in the neighborhood of 150° F. by vapor coming at approximately 190° F. from vapor chamber 21 of the following stage through connecting line or conduit 32. About one-half of the water remaining in the fluidized sludge is removed in the second stage. A further partially dehydrated sewage solids and oil slurry is withdrawn from second evaporator stage 18 via connecting line 36, and charged to the evaporating region of the third evaporator stage 34 in the manner used for slurry transfer between the first and second stages.

In the third stage the product temperature is at about 250° F., maintained by steam supplied at about 300° F. by boiler-furnace 38 and transmitted through line 40. The substantially dehydrated slurry withdrawn from third evaporator stage 34 through line 42 contains approximately ½% to 3% water and about 15% solids, the remainder being oil. That slurry is in a substantially anhydrous or dry condition.

Level control in the several stages of the evaporator equipment is maintained by a level sensing element in the slurry sump of each stage which transmits signals to a throttle valve following the pump which supplies that stage. As shown, level sensing elements in the slurry sumps of first, second and third evaporator stages 16, 18 and 34 control pump discharge throttle valves in slurry feedlines 12, 30 and 36, respectively. The evaporator level control system illustrated and described is of a conventional nature.

The substantially dehydrated oil and solids mixture maintained at an appropriate level in the sump of third evaporator stage 34 and withdrawn continuously therefrom through line 42 is separated into two streams, one of which is delivered to centrifuge 44 and the other of which is recycled back to fluidizing tank 4, as further discussed hereinafter. The dry oil-solids slurry stream flowing to the centrifuge is separated there into process oil and a solids phase having a reduced oil content. The process oil is withdrawn through line 50 and delivered to centrifuge oil tank 52 for recycling through oil supply line 6 to fluidizing tank 4. If there be an excess of process oil so far as fluidizing needs are concerned, oil becomes available as a net product of the process.

The solids phase centrifuge output contains substantially all of the through-flowing sewage solids, and also has about 30 weight percent oil content. It is withdrawn from centrifuge 44 via connecting line 54 and further deoiled in mechanical press or expeller 56. The resulting substantially deoiled anhydrous sewage solids are delivered from press 56 via line or conveyor 58 to grinder 60, and then, in the illustrative embodiment, blown through line 62 to boiler-furnace 38 for burning in the combustion region thereof. In the alternative, the blown solids can be delivered through line 64 for withdrawal for external use, for example, as fertilizer. When the withdrawn expelled solids are utilized for fuel purposes or credits in boiler-furnace 38, they produce live steam required for operation of the process and usually can provide a thermally self-sustaining operation or even excess steam for other purposes. That is a most important feature in sewage sludge drying, since it represents great economy by reducing or eliminating fuel purchase requirements. In such a case, the only by-product is the mineral matter of the dried sewage solids burned to generate steam which can be recovered by well known dust collection procedures. Removal of that matter as ash from the boiler-furnace is by way of connecting line 66.

Besides the stream of deoiled solids flowing through or along line 58, a stream of oil is withdrawn from press 56 through line 68. That represents the oil pressed out of the stream of substantially anhydrous but still oil-containing material delivered to the press through line 54 from centrifuge 44. As shown, line 68 connects into line 42 so that oil flowing through line 68 mixes with and further fluidizes the dry slurry of sewage solids and oil flowing from the sump of third evaporator stage 34 to the centrifuge. That is not the only way in which the oil from press 56 could be handled. Such oil might, for instance, be sent directly to centrifuge oil tank 52 for prompt recycling to fluidizing tank 4.

It is a feature of the present invention that a portion of the substantially dehydrated or anhydrous sewage solids and oil mixture derived from third evaporator stage 34 is recycled through feedline 8, via pump 46 and throttle valve 48, to fluidizing tank 4 for mixture with the incoming sewage sludge. It has been found in tests run on activated sludge and on primary digested and activated sludges that recycling of solids has beneficial effects on the viscosity of the sludge-oil mixture, and insures the maintenance of high evaporation rates, while and on account of avoiding fouling of the evaporator tube surfaces. Thus, when the system is in operation and dehydrated solids are still being carried in an oil slurry at the product output of the third evaporator stage, a portion of that slurry stream is recycled to the fluidizing tank under control of throttle valve 48 in line 8 branched off of line or conduit 42.

As noted hereinbefore, the amount of solids recycled is such as to raise the solids content of the mixture in fluidizing tank 4 into the range about 25 to about 60 percent, preferably 30 to 50 percent, on an oil-free basis. In addition, the amount of oil recycled through line 6 is adjusted to ensure that a pumpable slurry is obtained throughout the process.

It is an advantage of the recycle or add-back of slurried solids in accordance with this invention, that the oil/solids ratio in the stream of material flowing from the fluidizing tank to the first evaporator stage can be reduced by as much as 50 percent. The quantity fed back is preferably controlled, in response to viscosity measurements made by a viscometer having a sensor 70 located in fluidizing tank 4, to optimize the viscosity of the sewage sludge and oil fed to first evaporator stage 16. The viscometer can be a viscosity analyzer of well known character. In the preferred embodiment of this invention throttle valve 48 is power operated, as will be understood by those skilled in the art, and responds to a viscosity proportional electrical signal from sensor 70 in such a way that when the viscosity of the mixture in tank 4 equals or exceeds a certain upper level the throttle valve 48 is actuated to permit recycled slurry to flow to tank 4 at a greater rate. Similarly, when the viscosity in tank 4 falls to or below a predetermined lower limit the servo link responds to a signal from the viscometer or its sensor and reduces the add-back rate of substantially anhydrous slurry.

It will be apparent that there is substantial advantage to be gained from the point of view of energy conservation in feeding back solids in the form of the slurry derived from the output of the last evaporation stage, since less energy need be expanded in the subsequent deoiling of the dry solids. It is to be noted, too, that in the cases of sewage sludge or waste solids concentrate inputs containing emulsions such as those having a high quantity of iron-fatty acid soaps derived from packing industry wastes, and materials such as animal manures, which tend to produce emulsions with the added oil, the recycling of solids as herein described is important to improve suspension properties, as well as avoid fouling of evaporator surfaces.

CONCLUSION

While the invention has been illustrated in the context of a three-stage or triple effect, backward flow evaporator, it can be used with other evaporators as well. It will, for example, be understood by those skilled in the pertinent art that product material may be sufficiently dry at the output of the third stage of a four-stage unit to be useful, when recycled, for regulating evaporator feed material viscosity as disclosed above. Further, recycling may be done advantageously from a late stage of a multi-stage, forward flow evaporator.

Protection by Letters Patent of this invention in all its aspects as the same are set forth in the appended claims is sought to the broadest extent that the prior art allows.

We claim as our invention:

1. In a process for dehydrating initially water-containing waste solids concentrates chosen from the group consisting of secondary sewage sludge, digested sewage sludge, mixtures of primary and secondary sewage sludges, those having relatively high quantities of iron-fatty acid soaps, those derived from packing industry wastes, and those containing animal manure, said concentrates having a non-fat solids concentration in the range 10% to 35% by weight on an oil-free basis, that process comprising the steps of (1) admixing such a waste solids concentrates with [a relatively non-volatile] *an* oil to obtain a mixture which will remain fluid and pumpable after the removal of its water content by heat evaporation; (2) dehydrating the resultant oil-containing mixture by heat evaporation in a multi-stage evaporator in a sequence of steps so ordered that the vapors evolved from each such step except the first are used as a heating medium in the preceding step, and (3) withdrawing a substantially anhydrous waste solids and oil slurry from a late stage of said evaporator, the improvement which comprises recycling at least a portion of the slurry so withdrawn and admixing it with the waste solids concentrate and oil in step (1) to form a mixture constituting a steady state feed material to said multi-stage evaporator having a non-fat solids content of from 25% to 60% on an oil-free basis.

2. The improvement of claim 1 in which the steady state evaporator feed material has a non-fat solids content of from 30% to 50% on an oil-free basis.

3. The improvement of claim 1 in which the [relatively non-volatile] oil is a petroleum oil having a boiling point in the range 300° F. to 500° F.

4. The improvement of claim 1 in which the amount of recycled slurry is continuously controlled to optimize the viscosity of the resultant feed material to the evaporator to a level which substantially prevents fouling of heat transfer surfaces in any stage of the evaporator.

5. The improvement of claim 4 in which the viscosity of the evaporator feed material is measured during mixing of the recycled slurry.

6. The improvement of claim 1 in which the initially water-containing waste solids concentrate is chosen from the group consisting of secondary sewage sludge, digested sewage sludge and mixtures of primary and secondary sewage sludges.

7. The improvement of claim 1 in which the recycled slurry is withdrawn from the last evaporator stage.

8. The improvement of claim 1 wherein the concentrate being dehydrated is of a nature tending to form an emulsion with added oil, and wherein the amount of recycled slurry is continuously controlled such that said evaporator feed material is in the nature of a suspension and not an emulsion.

9. The improvement of claim 8 wherein the amount of recycled slurry is controlled in response to a viscosity measurement of the evaporator feed material.

10. An apparatus for dehydrating an initially water-containing waste solids concentrate, that apparatus comprising (1) a tank having means for receiving a stream of waste solids concentrate, means for receiving a stream of fluidizing oil and means for effecting mixing of those streams and having an outlet whereat a mixture so formed may be withdrawn from it; (2) a multi-stage evaporator having means for heating and dehydrating continuously a mixture of waste solids concentrate and oil formed in said tank and means for discharging water driven off therefrom as vapor, said evaporator having an inlet in its first stage whereat it may be supplied with material to be heated and dehydrated and an outlet in a late stage whereat substantially dehydrated material may be withdrawn from it; (3) conduit means extending from said outlet of said tank to said inlet of said evaporator wherethrough a mixture of waste solids concentrate and fluidizing oil may be supplied from said tank to said evaporator as feed material therefor; (4) means extending from said outlet of said evaporator for withdrawing a substantially anhydrous waste solids and oil slurry therefrom, and (5) means connected to said slurry withdrawing means and extending to said tank for recycling at least a portion of the slurry so withdrawn to said tank for mixing therein with said initially water-containing waste solids concentrate and said fluidizing oil.

11. The apparatus of claim 10 in which said multi-stage evaporator is a backward flow evaporator disposed to have fluid material to be heated and dehydrated in it and vaporous material to effect that heating and dehydrating flow through it countercurrently.

12. The apparatus of claim 10 or claim 11 further comprising control means for optimizing the viscosity of the mixed material fed to the evaporator for dehydration therein by controlling the rate at which substantially anhydrous waste solids and oil slurry is recycled to said tank.

13. The apparatus of claim 12 in which said control means is responsive to the viscosity of the contents of said tank.

14. The apparatus of claim 10 or claim 11 in which the outlet in said evaporator whereat substantially dehydrated material may be withdrawn from it is in the last stage thereof.

*15. The improvement of claim 1 in which the oil is a relatively non-volatile oil.*

* * * * *